US007610185B1

(12) United States Patent
Ershov

(10) Patent No.: US 7,610,185 B1
(45) Date of Patent: *Oct. 27, 2009

(54) GUI FOR SUBJECT MATTER NAVIGATION USING MAPS AND SEARCH TERMS

(75) Inventor: Alexander V. Ershov, Sergiev Posad (RU)

(73) Assignee: Quintura, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/957,281

(22) Filed: Dec. 14, 2007

Related U.S. Application Data

(60) Provisional application No. 60/891,542, filed on Feb. 26, 2007.

(51) Int. Cl.
*G06F 17/30* (2006.01)

(52) U.S. Cl. ............................... 703/3; 707/10; 706/12; 706/20

(58) Field of Classification Search ..................... 707/3, 707/10; 706/12, 20; 709/221; 715/853, 715/854
See application file for complete search history.

(56) References Cited

U.S. PATENT DOCUMENTS

| | | | | |
|---|---|---|---|---|
| 5,619,709 | A * | 4/1997 | Caid et al. .................. | 715/209 |
| 6,166,739 | A * | 12/2000 | Hugh .......................... | 715/854 |
| 6,189,002 | B1 * | 2/2001 | Roitblat ......................... | 707/1 |
| 6,233,575 | B1 * | 5/2001 | Agrawal et al. ................. | 707/6 |
| 6,304,864 | B1 * | 10/2001 | Liddy et al. .................... | 706/15 |
| 6,336,112 | B2 * | 1/2002 | Chakrabarti et al. ........... | 707/5 |
| 6,513,036 | B2 * | 1/2003 | Fruensgaard et al. .......... | 707/4 |
| 6,633,868 | B1 * | 10/2003 | Min et al. ....................... | 707/3 |
| 6,636,853 | B1 * | 10/2003 | Stephens, Jr. ................. | 707/10 |
| 6,748,375 | B1 * | 6/2004 | Wong et al. ..................... | 707/3 |
| 6,801,229 | B1 * | 10/2004 | Tinkler ........................ | 715/853 |
| 6,868,525 | B1 * | 3/2005 | Szabo ......................... | 715/738 |
| 6,931,604 | B2 * | 8/2005 | Lane ........................... | 715/853 |
| 6,961,731 | B2 * | 11/2005 | Holbrook ..................... | 707/102 |
| 7,054,870 | B2 | 5/2006 | Holbrook | |
| 7,181,438 | B1 * | 2/2007 | Szabo ........................... | 707/2 |
| 7,248,191 | B2 * | 7/2007 | Tanaka et al. .................. | 341/67 |
| 7,251,637 | B1 * | 7/2007 | Caid et al. ..................... | 706/15 |

(Continued)

OTHER PUBLICATIONS

Dursteler, Juan C., InfVis, http/infovis.net/printMag.php?num=97 &lang=2, KartOO, Aug. 19, 2002.*

(Continued)

*Primary Examiner*—Jean M Corrielus
(74) *Attorney, Agent, or Firm*—Bardmesser Law Group

(57) ABSTRACT

A system, method and computer program product for navigating categorized information, including (a) a two-dimensional map displayed to a user on a screen, the map showing search terms relating to a subject matter, where the display of the search terms corresponds to relationship between the terms, and wherein a manner of display of the terms corresponds to their relative importance to the subject matter; and (b) a neural network underlying the map, wherein the manner of display and a selection of the search terms is derived from the neural network. The manner of display includes font color, font size, font transparency, distance between search terms and positioning of the search terms within the map. Positioning of a cursor over one of the search terms rearranges the search terms on the map to correspond to an increased relevance of the one of the search terms, while the cursor is over the one of the search terms. Clicking on the one of the search terms corresponds to navigating into a subsubject matter of the one of the search terms.

21 Claims, 28 Drawing Sheets

U.S. PATENT DOCUMENTS

| | | | | |
|---|---|---|---|---|
| 7,496,548 | B1* | 2/2009 | Ershov | 706/20 |
| 7,529,743 | B1* | 5/2009 | Ershov | 707/3 |
| 7,530,020 | B2* | 5/2009 | Szabo | 715/738 |
| 7,574,659 | B2* | 8/2009 | Szabo | 715/738 |
| 2004/0015408 | A1* | 1/2004 | Rauen et al. | 705/26 |
| 2005/0144158 | A1* | 6/2005 | Capper et al. | 707/3 |
| 2005/0165766 | A1* | 7/2005 | Szabo | 707/3 |
| 2006/0288023 | A1* | 12/2006 | Szabo | 707/100 |
| 2007/0156677 | A1* | 7/2007 | Szabo | 707/5 |

OTHER PUBLICATIONS

Rizzo et al., "Spatial Organization using self-organizing Neural Networks",, 2002.*

Powers et al., "The magic Science of visualization", 2003.*

Tamara Munzner, Visualizing the structure of the world wide web in 3D hyperbolic space, ACM, 1995.*

Nicholas G. Tomaiuolo, "Answers.com and Xrefer: The Chevy and Bimmer of Ready reference", Jul./Aug. 2005.*

Dittenbach et al., "Using a Connectionist Approach for Enhancing Domain Ontologies: Self-Organizing word category maps revised", 2003.*

Benford et al., "Three Dimensional Visualization of the World Wide Web", 2000.*

"A divergent-style learning support tool for english learners using a thesaurus diagram", Kes 2006, part III, LNAI 4253, pp. 867-874.* www.visualthesaurus.com (user manuel), Oct. 18, 2000, pp. 1-23.*

* cited by examiner skating and blading sports
swimming and diving reptiles and amphibians computers and games
sports and recreation solar system
science and nature
united states
zoos and aquariums          world wide web
toy story around the world   boxing day
rap and hip-hop       countries
stuffed toys       art history
teddy bears     cars and trucks
television shows tall tales    fairy tales    activities holidays
cartoons movies  toys    toys of the past
religious stories stories    arts and entertainment
language arts
music               action figures
stories by young writers
social studies school bell  actors    virtual pets
giga pets young musicians
jokes and riddles
brass and wind instruments
stringed instruments
folk and traditional   comics and animation
drums and percussion
clubs and organizations    fun and humor academic programs

FIG.1 theater and drama studios   theatre
            photography
rap and hip-hop   dance
                  architecture
       performing arts
radio
                              television shows
            toys   countries   united kingdom
                 activities
play sites     titles   pictures   museums
                        music
                            videos   canada
opera     sounds   arts and entertainment   art history
   classical           movies   australia   around the world
   composers   actos
         musicians         cartoons
         jazz crafts   animated     comics and animation fashion networks
individual artists         fireworks
                              comics and animation fun and humor      electronic greeting cards

FIG.3 skating and blading sports
swimming and diving reptiles and amphibians weather computers and games sports and recreation solar system science and nature
united states
zoos and aquariums            world wide web
toy story
physics  science
around the world  boxing day
rap and hip-hop       countries
stuffed toys  paleontology
                       art history
teddy bears  physical sciences
                          cars and trucks    astronomy and space
television shows
tall tales         action nature  holidays                   aquatic life
       fairy tales
              cartoons movies   toys     toys of the past   botany
religious stories  stories      arts and entertainment     biology
language arts         medicine
              music                        action computer science
       stories by young writers                                chemistry
                          actors living things  virtual pets
social studies  school bell           giga pets  environment
                              inventions         ecology
                         young musicians geology
                 jokes and riddles
                                    history of science
          brass and wind instruments
       stringed instruments
                                 folk and traditional  comics and animation
              drums and percussion
clubs and organizations    fun and humor academic programs

FIG.6 airplanes and flying measurements and units  spacecraft                                                    york
                        solar system
                        astronomy and space
                                             united kingdom prehistoric animals    museums and exhibits
inventions                              unites states   florida
       machines                         california    zoos and aquariums
                   paleontology    canada   around the world
              the earth    volcanoes  countries
                                 new zealand                    hawaii
             geology            australia
                        science and nature
reptiles and amphibians  weather  environment
                                            birds
         physics    ecology
            chemistry                    mammals
physical sciences  biology
                                  invertebrates  aquatic life
        medicine              living things human spaceflight
                        botany cars and trucks
   history of science computer science
                   diseases and conditions
                   health and safety

FIG.7 trilobites                              airplanes and flying  uc museum of paleontology measurements and units                                                           york
                        spacecraft
types of dinosaurs      solar system
                        astronomy and space
                                                         united kingdom prehistoric animals            museums and exhibits
inventions                          saber-toothed tigers united states  florida
      machines                                    california        zoos and aquariums
                    paleontology ✪               canada  around the world
                    the earth         volcanoes  countries
                                           new zealand                    hawaii
              geology                       australia
                              science and nature
reptiles and amphibians    weather    environment          archaeopteryx
                              mastodons           birds  brontotherium
          physics     ecology mammoths
                chemistry                                mammals
physical sciences       biology                       dire wolves
                                                invertebrates       aquatic life
     medicine              ichthyosaur fossils
                                           living things
                               giant sloths
                     human spaceflight
                              botany cars and trucks
history of science computer science
                              diseases and conditions
                              health and safety

FIG.8 uc museum of paleontology museums and exhibits california prehistoric animals the earth videos        pictures fossils science and nature sounds geology paleontology mammals biology evolution genetics

FIG.9 swimming and diving traditional and board games typing reptiles and amphibians word games computers and games sports and recreation solar system science and nature united states zoos and aquariums reviews sega world wide web toy story prediction games screen savers and wallpaper around the world boxing day sports games stuffed toys nintendo art history teddy bears online games cars and trucks television shows tall tales fairy tales activities holidays animal games cartoons movies toys toys of the past apple computer religious stories stories arts and entertainment clip art language arts microsoft xbox computer and video games music action figures consoles and systems stories by young writers actors virtual pets social studies school bell giga pets internet tutorials young musicians cheats, hints, and codes jokes and riddles brass and wind instruments stringed instruments folk and traditional comics and animation drums and percussion clubs and organizations fun and humor academic programs

FIG.10 traditional and board games
software companies sports games
animal games
typing matching games
online games prediction games
word games
shareware
mazes
sonic the hedgehog series web page design puzzles clip art
history
world wide web sony playstation
halloween
apple computer
microsoft xbox  reviews  pictures  safety
nintendo  computers and games
consoles and systems  pokemon sega  cheats, hints, and codes  entertainment
internet tutorials screen savers and wallpaper
computer and video games titles
backyard sports  animals and nature
roller coaster tycoon
microsoft corporation crash bandicoot series
monkey island series
dbz hyper dimension
mega man  donkey kong series ethics game companies

FIG.11 traditional and board games    tangrams
tetris                          software companies sports games          animal games          typing matching games
online games⊙
                  word games
prediction games                  sonic the hedgehog series
      shareware     mazes
                                            web page design
            puzzles
                      clip art
          history              world wide web
     presidency    halloween
sony playstation                            apple computer
  microsoft xbox   online   pictures    safety
nintendo        computers and games
  consoles and systems                  anagrams
                    pokemon                 internet tutorials
        cheats, hints, and codes
sega                      entertainment  concentration
                                      screen savers and wallpaper
            computer and video games   chess
                                        checkers
                titles
                    backyard sports   animals and nature
                roller coaster tycoon
microsoft corporation
                        hangman
                   crash bandicoot series
    monkey island series
         dbz hyper dimension
  mega man    donkey kong series ethics game companies

FIG.12 tangrams shareware sports games tetris animal games concentration                    videos
checkers
scrambles and sliders    traditional and board games
                         tic tac toe
                         online games
                         computers and games
                              word searches
                              crossword puzzles anagrams
        chess                                word games history
                        mazes       hangman
prediction games matching games

FIG.13 american business women's associations women's history stay-at-home mothers
recreation business and economy
shopping and services training mom      title ix   gender equity
tip    resource      by culture or group
risk     work   business
        parenting    organizations
review
    online   home    information
menopause   feature            education
   life    travel    sports    cultures and groups
     menstruation   fitness
                           breasts   women's studies
          entertainment    college and university departments and programs
magazines      health     feminism
     love
movies and film        relationship    finance web directories
          beauty      family
           fashion      female genitalia
       kegel exercises
          initiative
news and media
                     women's health      cooking
lesbian, gay, bisexual, and transgendered
dating care chats and forums

FIG. 15 romance spa  column
rama  world profile  web parenting
links
entertainment  online  catalog
business  guide
nutrition  relationship  dating
style  health  article
pageant  fitness  travel  women
protest  love  magazines  books
beauty
music
fashion  ten
female  tip
link  game  tv
american parent  celebrity
money  gossip
guy  horoscope
food  celeb decor
guilt
pain
concentrate

FIG.20

FIG. 23 zines american business women's association stay-at-home mothers
recreation business and economy
shopping and services training mom   sharing            title ix   gender equity
tip   quiz   resource                by culture or group
risk      work  business
review    parenting    organizations
          feature  home  information
menopause                       education
        life   travel  sports   cultures and groups
              style  fitness              adventure
                  entertainment        women's studies
        magazines           college and university departments and programs
                   health         companion
                   love                 feminism
trip                 relationship  finance  web directories
Movies and film  beauty          destination
                    fashion  family
                          festival
                       idea news and media
                         women's health        cooking
        lesbian, gay, bisexual, and transgendered
               dating care chats and forums

FIG. 23 recreation automative   zines topic                         trip
dating
                                        trick
              related
shopping
relationship         biography
entertainment  quiz
        fashion                    tip
   beauty              work      sharing
              business
love    article    resource
    magazines  women  information
road         health              story      find
              travel
           feature    idea
           review                       companion
      feminism  books
    sexuality           children
              journals
                        designed festival              international
spring      essay
                              adventure
        photography            unite
            cooking facility    destination

Education

Directory > Education

INSIDE YAHOO!

Yahoo! Education - K-12 Schools - Colleges - Online Degrees - Reference

CATEGORIES (What's This?)

Top Categories

- Adult and Continuing Education (276)
- Browse by Region (168)
- By Culture or Group (306)
- By Subject (974)

- Distance Learning (672)
- Higher Education (17246) NEW!
- K-12 (54564) NEW!

Additional Categories

- Academic Competitions (92)
- Bibliographies (7)
- Bilingual (17)
- Business to Business@
- Career and Vocational (302)
- Chats and Forums (22)
- Conferences (28)

- Job and Employment Resources@
- Journals (39)
- Legislation (10)
- Literacy (33)
- News and Media (83)
- Organizations (2490)
- Policy (48)

SPONSOR RESULTS

Education Degree Study
Earn a doctoral, master's or bachelor's degree online at Walden...
info.waldenu.edu Earn an Accredited Degree Online
US or Canada residents find an online degree in business,...
www.nextag.com Over 65 Online Degrees and Courses
Canyon College offers online Bachelor, Masters and Doctorate degrees.
www.canyoncollege.edu Free College Education Information
Find the school that's right for you.

CONVENTIONAL ART
FIG.27

GUI FOR SUBJECT MATTER NAVIGATION USING MAPS AND SEARCH TERMS

CROSS REFERENCE TO RELATED APPLICATIONS

This application is a non-provisional of U.S. Provisional Patent Application No. 60/891,542, filed Feb. 26, 2007, entitled GUI FOR SUBJECT MATTER NAVIGATION USING MAPS AND SEARCH TERMS, which is incorporated herein by reference in its entirety.

BACKGROUND OF THE INVENTION

1. Field of the Invention

The present invention relates to techniques for navigating categorized information using a graphical user interface.

2. Description of the Related Art

One of the issues in modern search engine development is allowing the user to navigate pre-categorized information, which is arranged by theme, or subject matter. For example, on Yahoo, www.yahoo.com, it is possible to view a tree-like taxonomy of information that has been indexed by Yahoo. The structure of this taxonomy is tree-like, moving from the broadest level, to more detailed, and so forth. To navigate the tree, the user clicks on links (which represent branches and sub-branches of the tree), which the user views as most relevant to his particular interests, and therefore likely to lead to the document that he is searching for. Examples of this tree structure are illustrated in the screen shots in FIGS. 25-27, in this case, with the subject matter centered around "kids/children."

One of the difficulties for most users with such tree-like structures is the fact that the human mind does not normally operate in this fashion—for most people, information is not structured into a tree, but has many connections between branches of the tree, sub-branches of the tree, connections between sub-branches of different branches, and so forth—in other words, information, as perceived by the human mind, has many more connections and inter-relationships than would be obvious from simply organizing it into a tree-like taxonomy.

Another difficulty with the tree-like organization of information is the fact that moving "horizontally," or moving "at an angle" (conceptually), where the user moves from one sub-branch on one level to a different sub-branch, and possibly to a different level, of the tree, is usually not permitted. The user, having "gone down" into a particular branch, sub-branch, sub-sub-branch, etc., and having discovered that the information there is not what he is seeking, needs to go back "up" the tree, and repeat the process again for a different branch, sub-branch, etc. This is a fairly cumbersome method of navigating organized information, and is one reason why many users are in fact unaware that a search engine, such as Yahoo, provide for this form of searching for information—while such an organization makes it easy for structuring searches in a computer, it is counter intuitive to most people, and therefore, frequently useless.

Accordingly, there is a need in the art to enable users to navigate information organized by subject matter or theme, in an intuitive and easy to understand manner.

SUMMARY OF THE INVENTION

Accordingly, the present invention is related to a system, method and computer program product for using graphical maps as a user interface for navigation of categorized information that substantially obviates one or more of the disadvantages of the related art.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 1-13 illustrate an exemplary use of the present invention for navigating the subject matter of kids/children.

FIGS. 14-24 illustrate an exemplary use of the present invention for navigating the subject matter of women/women's issues.

Figure 25:
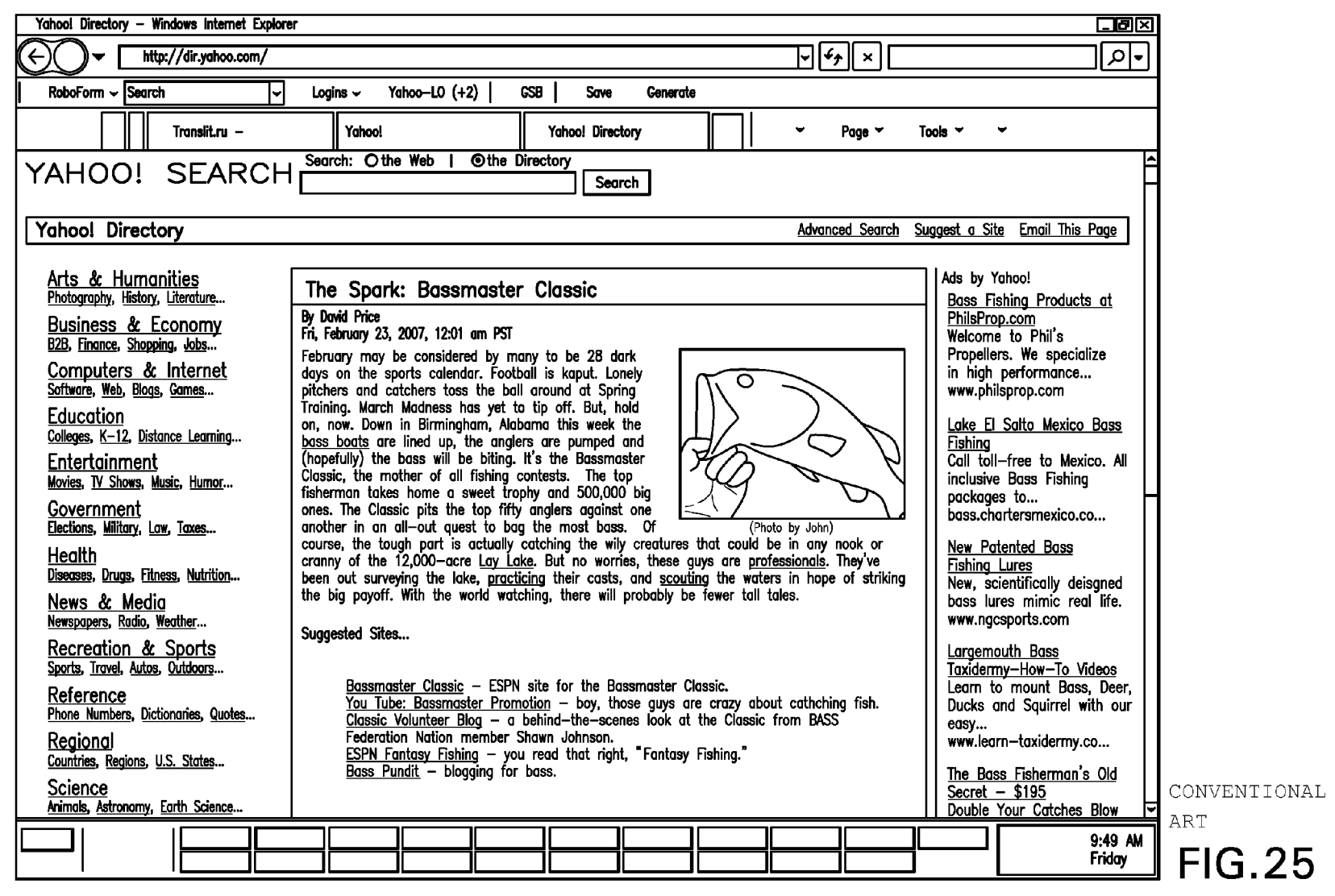
Figure 27:
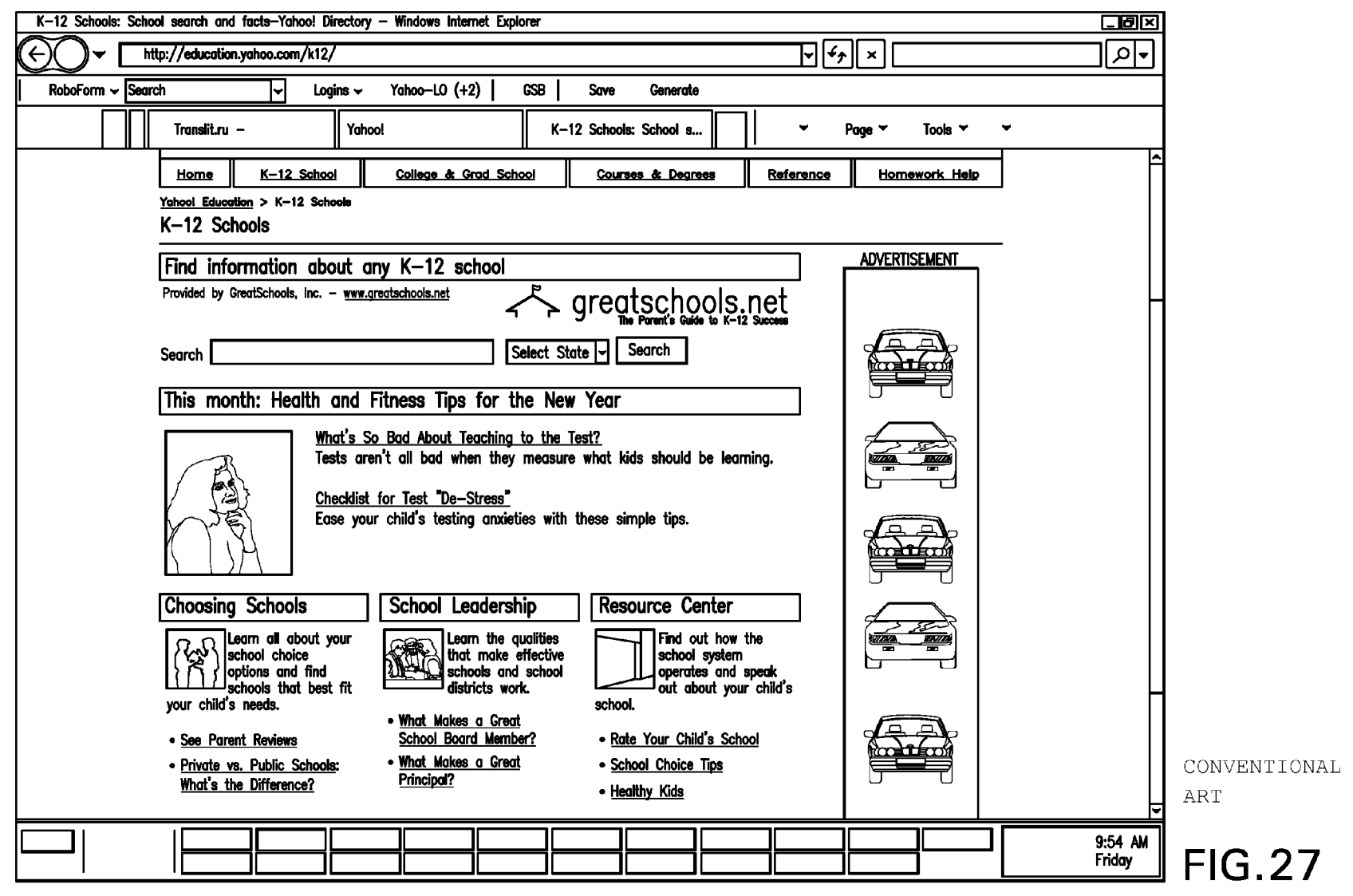

FIGS. 25-27 show screenshots of a conventional tree-like organization of information.

DETAILED DESCRIPTION OF THE PREFERRED EMBODIMENTS

Figure 2:
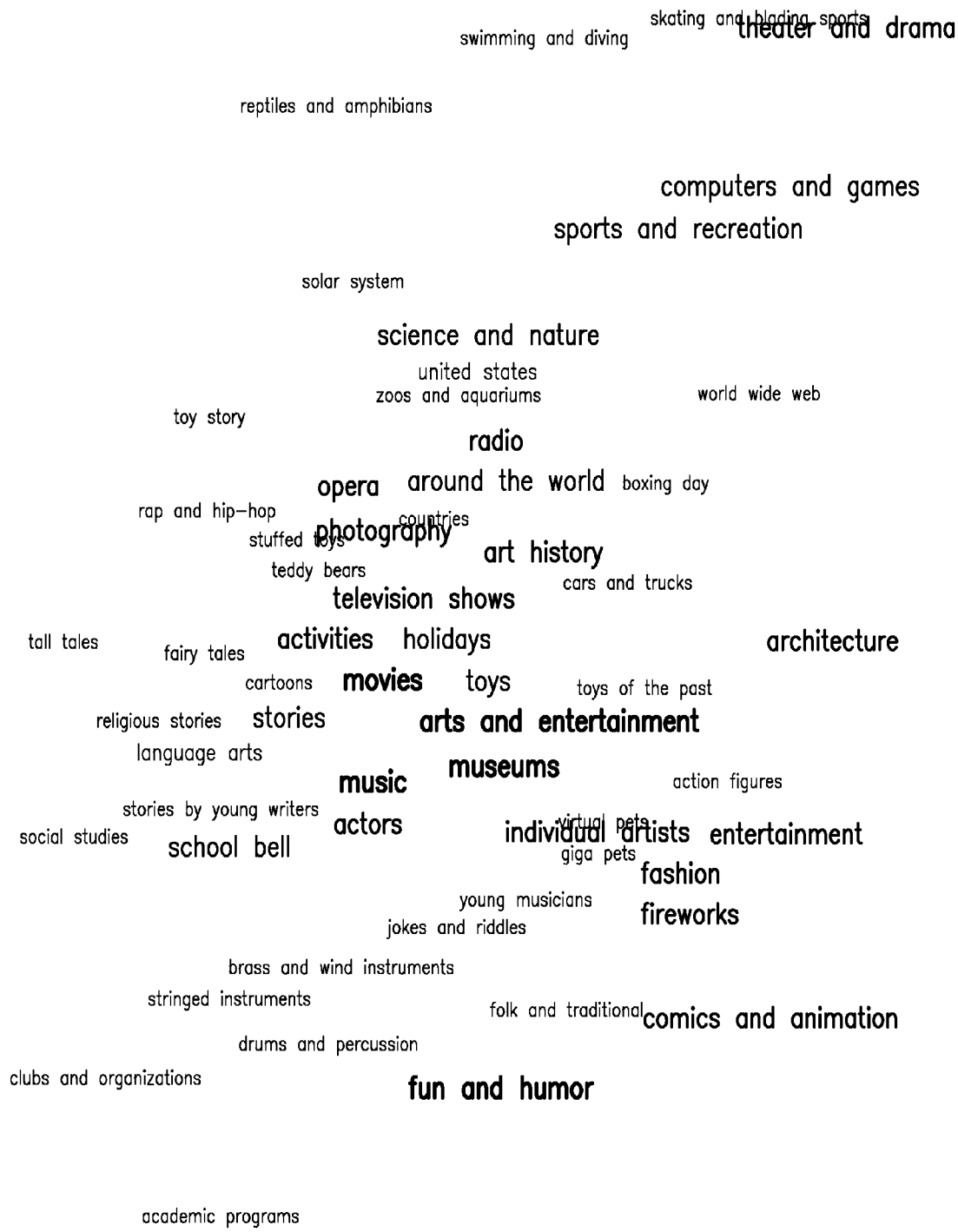

Reference will now be made in detail to the embodiments of the present invention, examples of which are illustrated in the accompanying drawings. The approach described herein relies on neural networks, such as described in U.S. patent application Ser. No. 11/468,048; Filed: Aug. 29, 2006, entitled NEURAL NETWORK FOR ELECTRONIC SEARCH APPLICATIONS, incorporated herein by reference, to formulate a multi-dimensional map, on which words, corresponding to search terms and subject matters, are represented. Such a map can then be used for navigation. Also, such a map can be combined with displays of links to the web pages at issue, as well as annotations, such as described in U.S. patent application Ser. No. 11/535,306; Filed: Sep. 26, 2006, entitled USE OF NEURAL NETWORKS FOR ANNOTATING SEARCH RESULTS and Provisional U.S. Patent Appl. No. 60/890,507; Filed: Feb. 19, 2007, entitled SEARCH ENGINE GRAPHICAL INTERFACE USING MAPS AND IMAGES, both of which are incorporated herein by reference in their entirety.

The neural network underlying each such pre-made map can be initially created, as described in U.S. patent application Ser. No. 11/468,048, incorporated herein by reference in its entirety, from a set of documents that are known a priori to relate to the particular subject matter. These documents can be manually pre-selected, or can be generated based on an index available from search engines, such as from Yahoo, Inc., or can be generated based on a number of broad, intermediate, and narrow searches that (in the view of the searcher) relate to the subject matter. In this discussion, two examples are used, "children" and "women," chosen in this case primarily because of the breadth of the subject matter. As will be recognized by one of ordinary skill in the art, the breadth of the subject matter means that if the information were structured and presented as a taxonomic tree, the tree would have many levels in its hierarchy (branches, sub-branches, sub-sub-branches, etc.). Therefore, these two examples provide a good illustration of how the organization of the information using neural networks is done, and how navigation of such information is then performed, using the approach described herein.

Once the initial set of documents is chosen, and an initial map is constructed, it is also possible to edit the map manually, if desired. For example, if the subject matter is children (and the map is intended to be of interest to children), the map can be manually edited to exclude adult-related material, pornographic material, or anything that accidentally ended up included in the map, but is subjectively believed, by whoever constructs the map, to not belong there.

Also, if a particular subject matter is believed to be closely related to the subject matter at issue, additional searches can be performed to identify documents related to that related subject matter, and those documents (or, equivalently, a map corresponding to the documents) can be merged into the neural network that underlies the pre-made map at issue.

In this manner, a number of such maps can be created, for each subject matter, and it will be appreciated that each such map corresponds to a branch of a tree in a conventional search engine's index, or, equivalently, to a directory. Furthermore, the map can be modified over time, for example, if it is observed that certain search terms, or combinations of search terms, or subject matter underlie those terms, is of higher than expected interest to most users, the relative importance of those terms can be increased, which would result in a modified map. That map can then be presented to users as "the" map for "children."

FIG. 1 illustrates an exemplary pre-made map for the subject matter "children." As will be seen in FIG. 1, the subject matters, or themes, within the broader category "children" that are of a particular importance are highlighted in bold (in essence, corresponding to branches from the "children" tree, or, equivalently, subdirectories within the "children" directory). This map, as discussed earlier, can be pre-made.

FIG. 2 illustrates an example of how the map can be navigated. By bringing the cursor to the "arts and entertainment" search term (see the hand-shaped icon near the words "arts and entertainment" in the map), the map is rearranged, so that some of the search terms become less important (for example, "computers and games," which used to be highlighted, is no longer highlighted, indicating that it is less relevant to the user who is interested in the subject matter of the sub-branch "arts and entertainment").

FIG. 3 illustrates what would happen to the map if, in addition to bringing the cursor over to "arts and entertainment" the user clicked on this search term. The map, as will be seen, is again rearranged, with, in this case, font size indicating relative importance of the displayed search terms (as well as the distance on the screen from the primary search term ("arts and entertainment")) to the other search terms (including newly displayed ones). In other words, the manner of display of each search term is dynamic (as opposed to static), with the display incorporating the "depth" of the search term, as far as its relevance to the current search is concerned, based on the underlying neural network. As such, the map may be conceptually viewed as a three-dimensional map, with the two dimensions displayed on the screen in the sense of X and Y, and the third dimension (depth into the tree branch) displayed graphically using such artifacts as font, color, transparency, animation effects, etc. When the user performs some operations on the map (e.g., deleting a term, or emphasizing importance of the term), the map is rearranged (e.g., the coefficients in the underlying neural network change0, and the same term can appear different on the screen (different font, color, transparency, size, etc.) In effect, by clicking on the term "arts and entertainment," the user selected a taxonomic branch, or directory, within the subject matter "children." Note also that the user does not need to view the process he is going through in terms of initiating additional search engine searches, even though this is what he is in effect doing.

Figure 4:
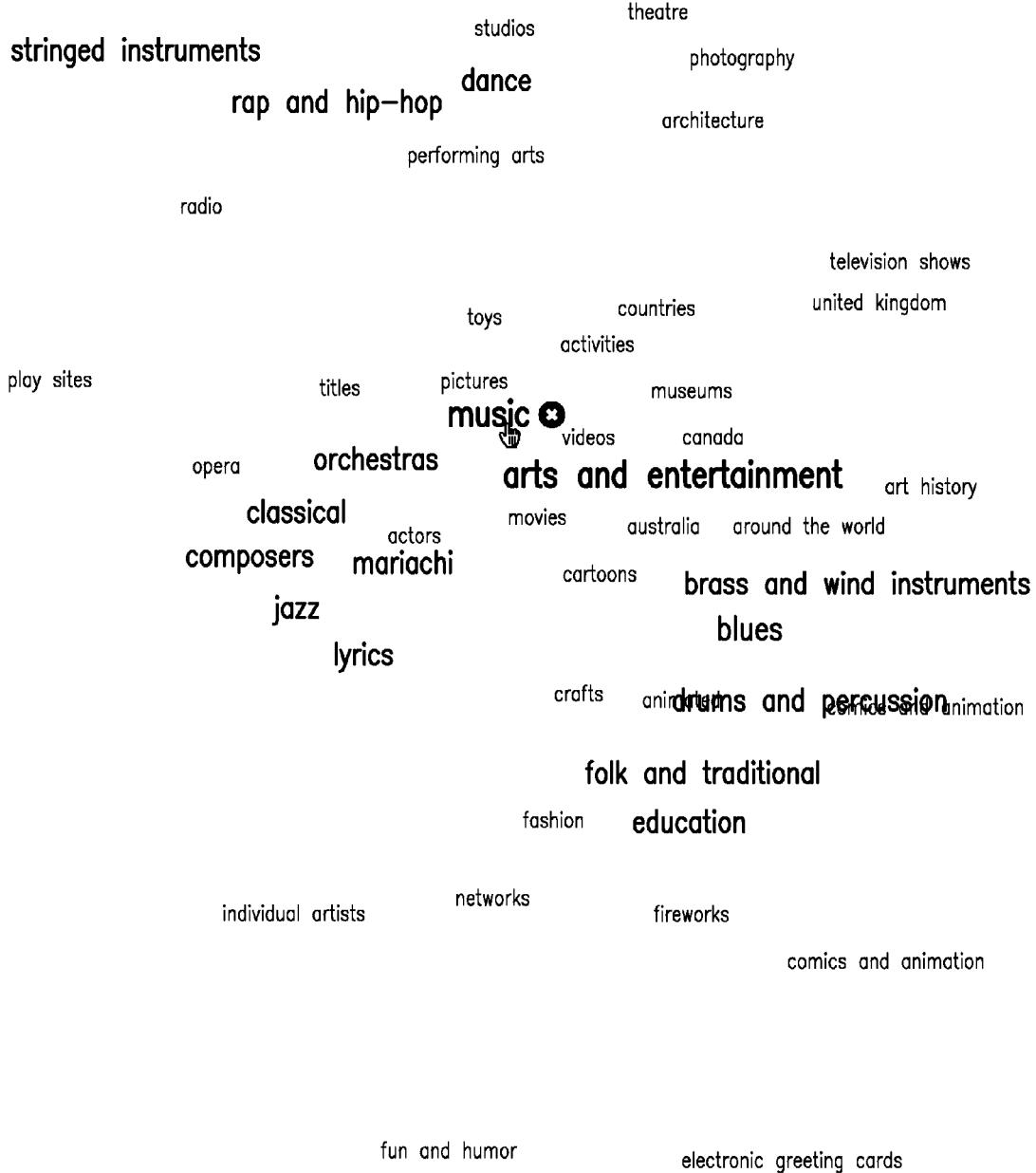

FIG. 4 illustrates an additional example of how the map can be manipulated, by bringing the cursor to the search term "music." The map is again rearranged, as illustrated in FIG. 4.

Figure 5:
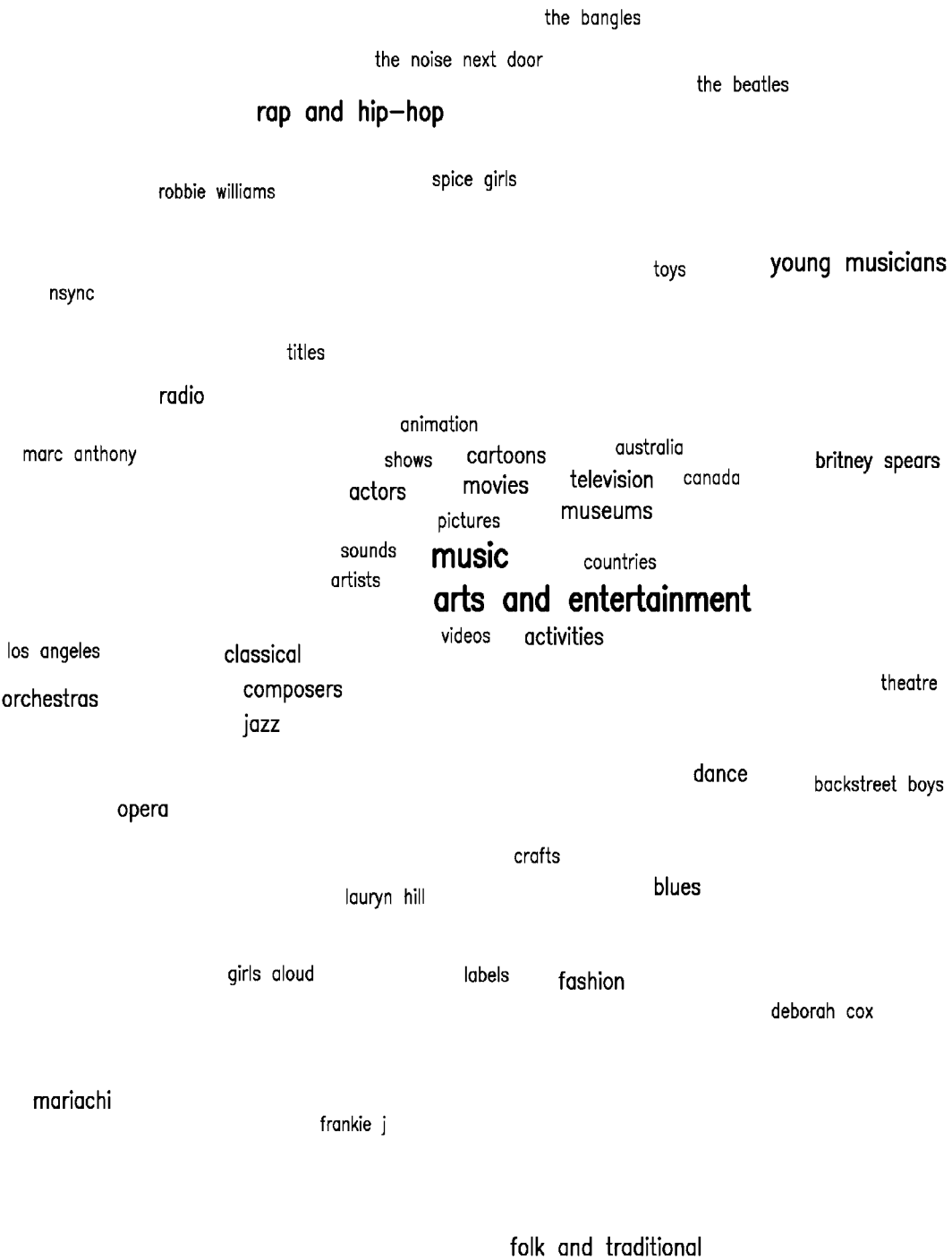

FIG. 5 illustrates what happens to the map when the search term "music" is clicked on. This map represents, in a sense, a combination of the branches "arts and entertainment" and "music"—in essence, the map that is displayed illustrates search terms that are relevant to both of these branches, with location and font size (and, optionally, font color) indicative of those terms that are particularly relevant to both terms "arts and entertainment" and "music," and smaller font being indicative of the search term that is only primarily relevant to one of the two highlighted search terms.

FIG. 6 illustrates how the user can navigate down another branch within the "children" tree, in this case, the "science and nature" branch. In effect FIG. 6 represents FIG. 1, where the cursor is brought over to the "science and nature" term. Note how the map changes from that shown in FIG. 1 to that shown in FIG. 6. By clicking on the "science and nature" search term, the map of FIG. 7 (corresponding to that branch, or directory) is displayed. FIG. 8 illustrates how the map is rearranged when the user brings the cursor over to the "paleontology" search term (i.e., conceptually moving "deeper" into the tree). In FIG. 9, the user has clicked on the term "paleontology," and the resulting map is displayed in FIG. 9.

FIG. 10 illustrates navigation down another branch, in this case, the "computers and games" branch. In this case, FIG. 10 is what results when, in the map of FIG. 1, the user brings the cursor to the "computers and games" search term. FIG. 11 is an illustration of what happens when the user clicks on the search term "computers and games," illustrating how the map changes to correspond to the selection. FIG. 12 illustrates, in essence, traveling, or navigating, down the branch, where the user brings the cursor to the term "online games." FIG. 13 is an illustration of what happens to the map when the search term "online games" is clicked on.

Figure 14:
Figure 16:
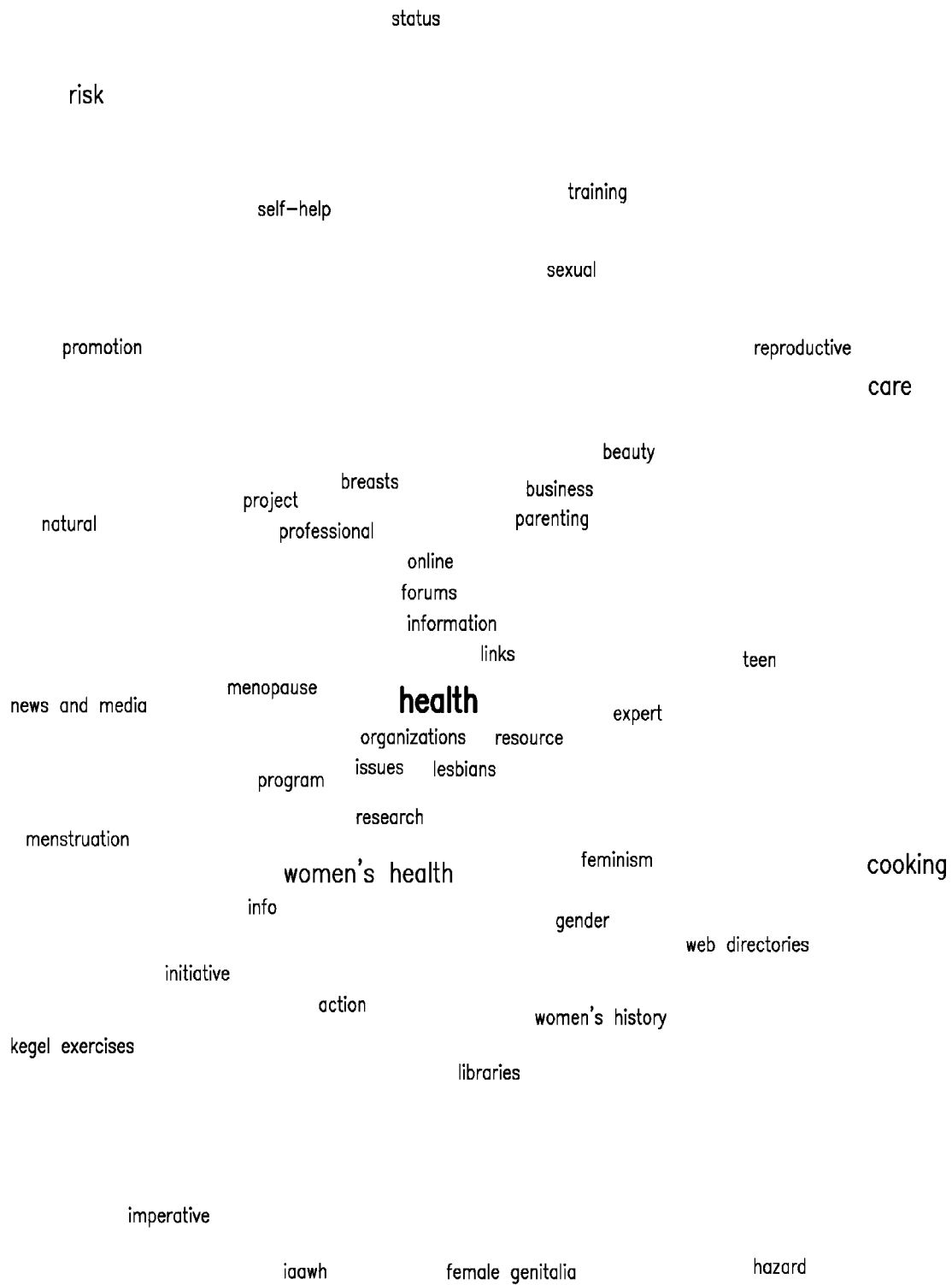
Figure 17:
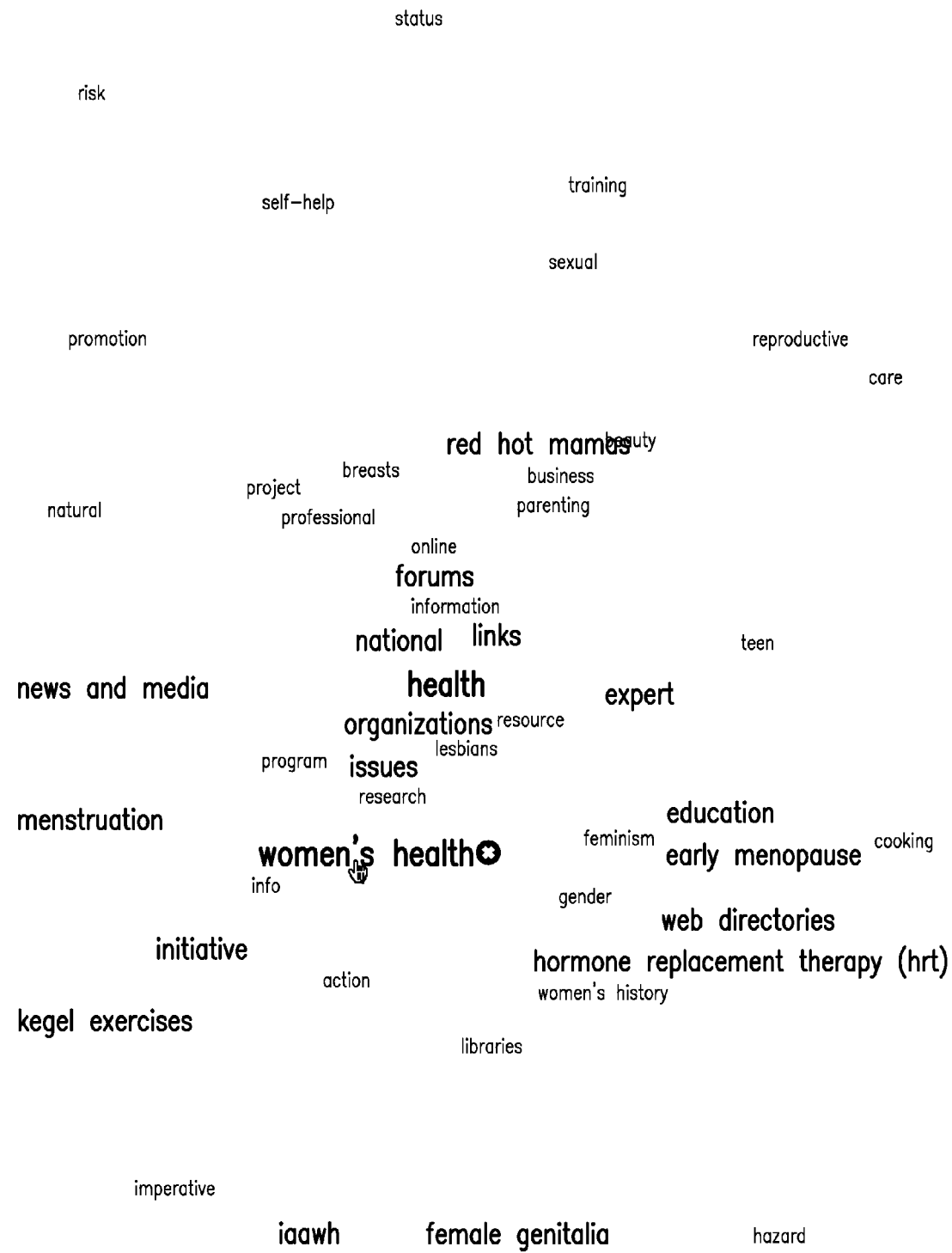
Figure 18:
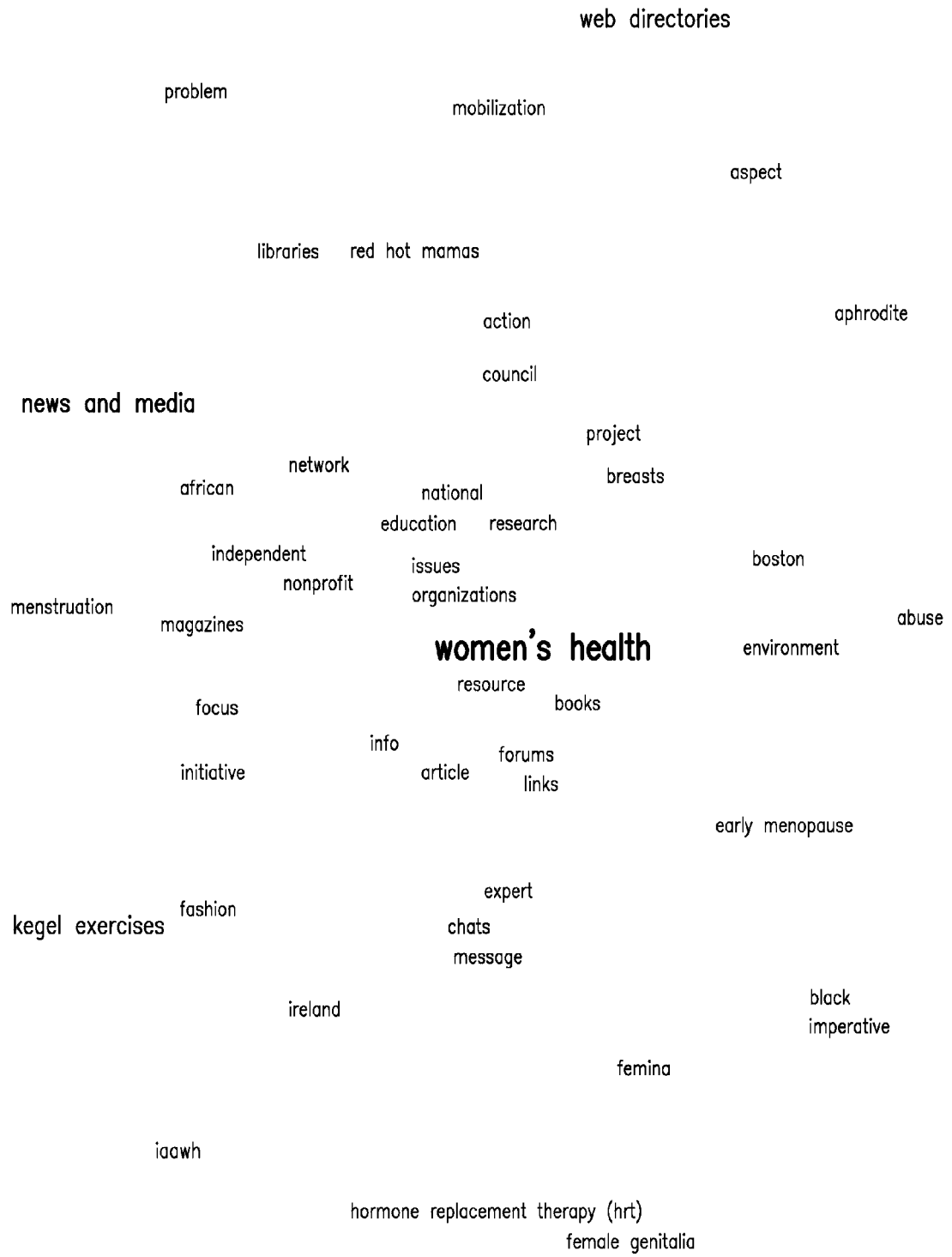

FIGS. 14-24 illustrate how the principles described above apply to another relatively broad subject matter area, in this case, women. FIG. 14 illustrates the map for the subject matter, with a highlighted terms generally corresponding to the branches of the tree—work, business, parenting, home, travel, etc. As with the case of the "children" tree/directory, by bringing the cursor to the "health" term, in FIG. 15, the map changes to show sub-branches under "health". FIG. 16 illustrates the map for the sub-branch "health." FIG. 17 illustrates what happens when the user brings the cursor to the search term "women's health." FIG. 18 illustrates what happens when the user clicks on the term "women's health"—essentially, traveling down into the tree.

Figure 19:
Figure 21:
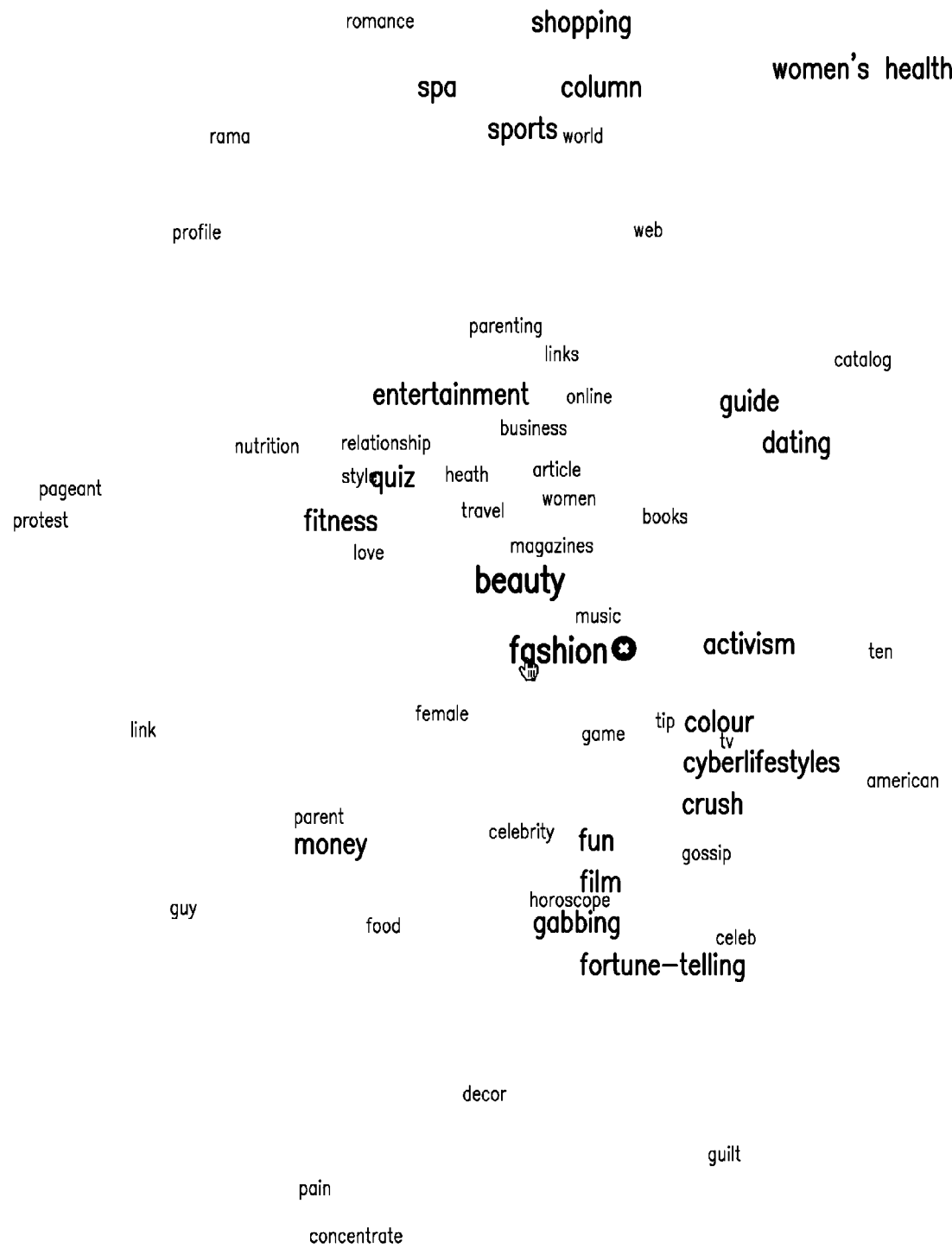
Figure 22:
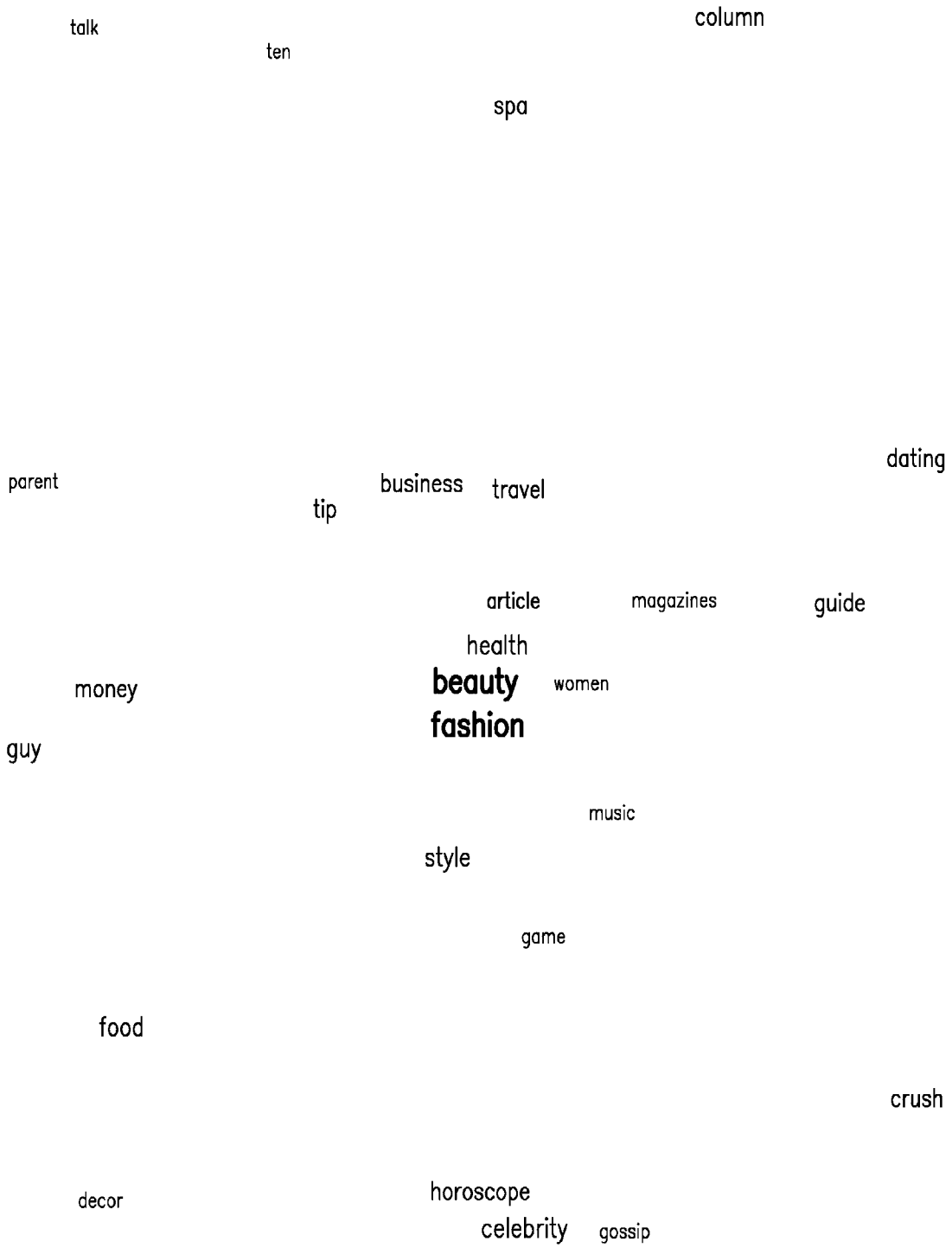

FIG. 19 illustrates the map of FIG. 14, where the user brought the cursor to the search term "beauty." FIG. 20 illustrates the map for the sub-branch "beauty"—in other words, what happen when the user clicks on the term "beauty." FIG. 21 illustrates navigation within the "beauty" sub-branch (directory)—where the user brings the cursor to the term "fashion." FIG. 22 illustrates what happens when the user clicks on the term "fashion." FIG. 23 illustrates the map of FIG. 14, where the user brings the cursor to the search term "travel." FIG. 14 illustrates the map for the "travel" sub-branch (directory).

Furthermore, it will be appreciated that an already existing map (in other words, an already existing neural network) can be used to index other documents, and identify relevant documents out of a larger set of documents.

Figure 28:
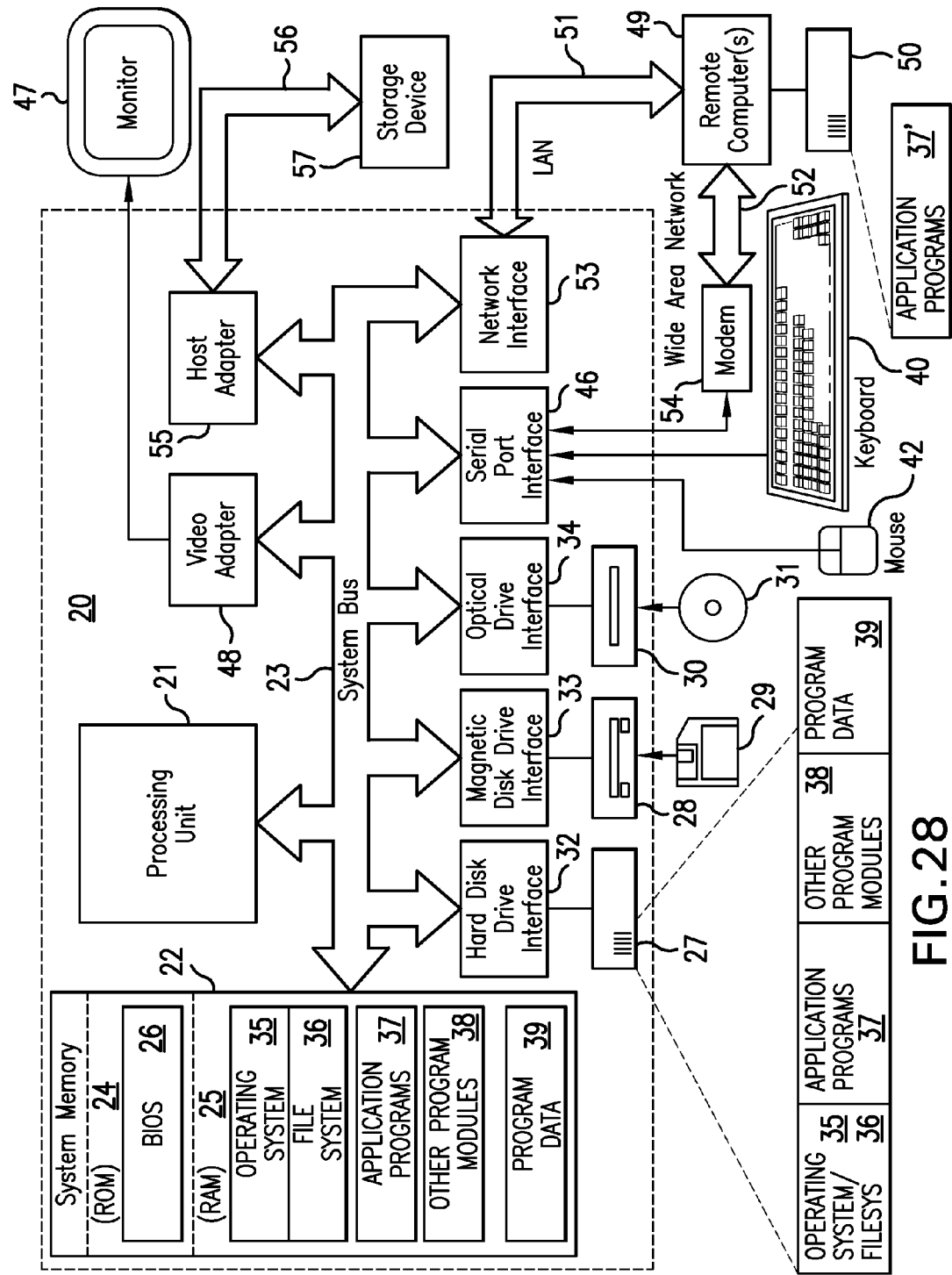
FIG. 28 illustrates an exemplary computer system on which the invention may be implemented.

With reference to FIG. 28, an exemplary computer system, where the invention can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for navigating categorized information, the system comprising:
   a processor;
   a memory coupled the processor;
   computer code loaded into the memory for performing the functions of:
   displaying a two-dimensional map to a user, the map showing search terms relating to a subject matter, where a position of each search term corresponds to relationships between all the search terms;
   dynamically changing a display of the terms and a position of the search terms relative to each other based on user input into the map, the display corresponding to relative importance of the search terms to the subject matter;
   changing a context of a search and selecting a different branch of a taxonomic tree in response to a user input to select one of the search terms to display different search results based on a combination of different branches;
   displayed separately from the map, a plurality of hyperlinks corresponding to the different search results;
   a neural network underlying the map, wherein the display, the position of the search terms on the map and a selection of the displayed search terms are derived from the neural network, and
   displaying to the user additional search terms derived from the search results by the neural network.

2. The system of claim 1, wherein the neural network is a bidirectional neural network.

3. The system of claim 1, wherein positioning of a cursor over one of the search terms rearranges the search terms on the map to correspond to an increased relevance of that search term, while the cursor is over that search term.

4. The system of claim 3, wherein clicking on that search term corresponds to navigating into a sub-subject matter of that search term.

5. The system of claim 3, wherein clicking on that search term rearranges the map to increase importance of the selected search term in the search query.

6. The system of claim 3, wherein clicking on an icon next to one of the search terms rearranges the map to decrease importance of the selected search term in the search query.

7. The system of claim 3, wherein clicking on an icon next to one of the search terms rearranges the map corresponding to adding a Boolean "NOT" operator for the selected displayed search term in the search query.

8. The system of claim 3, wherein, the display includes any of font color, font size, font transparency, distance between search terms and positioning of the search terms within the map relative to each other.

9. The system of claim 3, wherein at least some of the search terms correspond to different branches of the taxonomic tree.

10. The system of claim 3, wherein selecting a different branch of the taxonomic tree is performed without moving upwards in the taxonomic tree.

11. The system of claim 3, wherein the display of the search terms and position of the search terms relative to each other is changed dynamically.

12. A computer-implemented method for navigating categorized information, the method being performed on a computer having a processor and a memory, the method comprising:
- displaying a two-dimensional map to a user, the map showing search terms relating to a subject matter, where a position of each search term corresponds to relationships between all the search terms;
- dynamically changing a display of the terms and a position of the search terms relative to each other based on user input into the map, the display corresponding to relative importance of the search terms to the subject matter;
- in response to input from a user, changing a context of a search and selecting a different branch of a taxonomic tree when the user selects one of the search terms to select different search results based on a combination of different branches;
- separately from the map, displaying a plurality of hyperlink results;
- deriving the display of the search terms, the position of the search terms on the map and a selection of the displayed search terms from a neural network that underlies the map; and
- displaying to the user additional search terms derived from the search results by the neural network.

13. The method of claim 12, wherein the neural network is a bidirectional neural network.

14. The method of claim 12, wherein positioning of a cursor over one of the search terms rearranges the search terms on the map to correspond to an increased relevance of that search term, while the cursor is over that search term.

15. The method of claim 14, wherein clicking on that search term corresponds to navigating into a sub-subject matter of that search term.

16. The method of claim 14, wherein clicking on that search term rearranges the map to increase importance of the selected search term in the search query.

17. The method of claim 14, wherein clicking on an icon next to one of the search terms rearranges the map to decrease importance of the selected search term in the search query.

18. The method of claim 14, wherein clicking on an icon next to one of the search terms rearranges the map corresponding to adding a Boolean "NOT" operator for the selected displayed search term in the search query.

19. The method of claim 14, wherein the map is pre-made for the particular search query.

20. The method of claim 14, wherein a projection of the neural network onto the map is rearranged in response to user input into the map.

21. A computer program product comprising a computer useable storage medium having computer program logic recorded thereon for executing on at least one processor, the computer program logic comprising computer program code for implementing the following steps:
- displaying a two-dimensional map to a user, the map showing search terms relating to a subject matter, where a position of each search term corresponds to relationships between all the search terms;
- dynamically changing a display of the terms and a position of the search terms relative to each other based on user input into the map, the display corresponding to relative importance of the search terms to the subject matter;
- changing a context of a search and selecting a different branch of a taxonomic tree in response to a user input to select one of the search terms to display different search results based on a combination of different branches;
- displayed separately from the map, a plurality of hyperlinks corresponding to the different search results; and
- a neural network underlying the map, wherein the display the position of the search terms on the map and a selection of the displayed search terms are derived from the neural network, and
- displaying to the user additional search terms derived from the search results by the neural network.

* * * * *